(12) United States Patent
Hibi et al.

(10) Patent No.: US 6,885,428 B2
(45) Date of Patent: Apr. 26, 2005

(54) LIGHT SOURCE DEVICE AND PROJECTION TELEVISION

(75) Inventors: Taketoshi Hibi, Tokyo (JP); Akihisa Miyata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 204 days.

(21) Appl. No.: 10/082,086

(22) Filed: Feb. 26, 2002

(65) Prior Publication Data

US 2002/0171807 A1 Nov. 21, 2002

(30) Foreign Application Priority Data

Mar. 28, 2001 (JP) ........................................ 2001-092114

(51) Int. Cl.[7] ........................ G03B 21/00; G03B 21/28; G02B 27/10
(52) U.S. Cl. ........................ 352/198; 359/618; 353/34; 353/99
(58) Field of Search ........................ 353/20, 31, 34, 353/98, 99; 348/744, 758, 771; 359/223, 224

(56) References Cited

U.S. PATENT DOCUMENTS

| | | | |
|---|---|---|---|
| 5,369,433 A | * 11/1994 | Baldwin et al. | 348/207.99 |
| 5,467,146 A | 11/1995 | Huang et al. | |
| 5,633,755 A | * 5/1997 | Manabe et al. | 359/443 |
| 5,833,360 A | 11/1998 | Knox et al. | |
| 5,963,276 A | * 10/1999 | Inbar | 349/5 |
| 6,618,186 B1 | * 9/2003 | Kaeriyama | 359/292 |
| 2002/0149852 A1 | * 10/2002 | Dubinovsky et al. | 359/618 |

OTHER PUBLICATIONS

Patent Abstracts of Japan, vol. 2000, No. 12, Jan. 3, 2001.

Patent Abstracts of Japan, vol. 2000, No. 16, May 8, 2001.

* cited by examiner

*Primary Examiner*—Judy Nguyen
*Assistant Examiner*—Arthur Smith
(74) *Attorney, Agent, or Firm*—Birch, Stewart, Kolasch & Birch, LLP

(57) ABSTRACT

A projection television has a unit for reflecting OFF light not advancing toward a screen of light emitted by a reflection type light modulating element and a unit for controlling the amount of the reflecting OFF light and returns the OFF light which has not been used in a conventional device to the light source to reuse the OFF light. This configuration increases the utilization efficiency of the light and, as a result, can realize a powerful projection television having a bright projection image.

20 Claims, 9 Drawing Sheets

(a)

(b)

(a)

(b)

(c)

(d)

(a)

(b)

$m = (1-P) \cdot K$

LIGHT SOURCE DEVICE AND PROJECTION TELEVISION

BACKGROUND OF THE INVENTION

Field of the Invention

The present invention relates to a projection television and, in particular, to a light source device relating to an image display (optical system, driving system and the like) and the configuration thereof.

In recent years, there have been realized large-size displays having a screen size larger than a direct-view-type television of a cathode ray tube (hereinafter referred to as CRT) system.

One of them is a projection television (projection type display). Basically, the projection televisions are broadly divided into two types of configurations:

that is, (1) a projection television using a CRT as a light source and having a projection optical system for enlarging and projecting light emitted by the CRT and a screen for receiving the projected light; and (2) a projection television for applying light (white light or a color filter output light of this white light) from a light source emitting white light (white light source) to a light modulating element such as a light valve or the like and having a projection optical system for enlarging and projecting the light modulated by the light modulating element and a screen for receiving the projected light.

In the light modulating element used in the case (2) of the above-mentioned two types of projection televisions, various types of elements such as a liquid crystal light valve, a DMD (Digital Multi-mirror Device) and the like are adopted (DMD is a trademark of Texas Instrument Co. Ltd).

The best element of these light modulating elements is the DMD which is a reflection type light modulating element. The DMD has a large number of micro mirrors (mirror elements) which are two-dimensionally arranged and can be independently driven. The DMD is more advantageous in utilization efficiency of light than the other light modulating elements.

FIG. 1 is an illustration to show the operation of the DMD as a light modulating element used in a projection type display, which is disclosed in Japanese Patent Publication Laid-open No. 8-21977 (This is equivalent to U.S. Pat. No. 5,467,146). The DMD will be hereinafter described with reference to FIG. 1.

FIG. 1 shows a mirror element constituting the DMD and schematically shows the relationship between its operation and optical path.

In this respect, the words of "ON" and "OFF" in the following description means as follows: "ON" means a state in which light is projected from a mirror element to a screen (or a state of the mirror element at that time) and "OFF" means a state in which light is not projected from a mirror to a screen (or a state of the mirror element at that time).

In FIG. 1, a reference numeral 1 designates a mirror element and the mirror element 1 is "ON" in a state of tilt 1 shown in FIG. 1(a). A reference numeral 2 shows a state of tilt in which the mirror element 1 is "OFF". A reference numeral 3 is a light receiving plane which incident light enters.

A reference character L1 designates incident light. A reference character L2 designates reflecting light (ON light) from the mirror element 1 in the case where the mirror element 1 "ON". A reference character L3 designates reflecting light (OFF light) from the mirror element 1 in the case where the mirror element 1 is "OFF".

A reference character L4 designates reflecting light (undesired reflecting light) from the mirror element 1 in the case where the mirror element 1 is in an intermediate state (for example, in the case where a power source is not turned on or in a standby state in which a driving signal is not applied, that is, in the case where all the mirror elements 1 constituting the DMD can be treated as one plane mirror as a whole).

An image display in a device using the DMD is realized by projecting light (ON light) reflected by mirror elements 1 in the "ON" state, among the many number of mirror elements 1 arranged two-dimensionally, to a screen (therefore, OFF light or undesired reflecting light does not relate to the image display).

When a power source is not turned on or in a standby state in which a driving signal is not applied, the mirror elements 1 are in the intermediate state in which they are along a plane (as described above, in the intermediate state, all the mirror elements 1 constituting the DMD can be treated as one plane mirror as a whole).

When the mirror element 1 is controlled so as to be "ON", it is tilted to a state of 1 shown in FIG. 1(a) (for example, at 10 degrees in the clockwise direction). Further, when the mirror element 1 is controlled so as to be "OFF", it is tilted to a state of 2 (for example, at 10 degrees in the counterclockwise direction, that is, $\theta=10$ degrees in FIG. 1(a)).

Accordingly, in the case where the mirror element 1 is "ON", the incident light L1 is reflected in the direction of ON light L2 in FIG. 1(a) by the mirror element 1 tilted at 10 degrees in the clockwise direction and is enlarged and projected to a screen by a projection optical system (not shown).

Further, in the case where the mirror element 1 is "OFF", the incident light L1 is reflected in the direction of OFF light L3 in FIG. 1(a) by the mirror element 1 tilted at 10 degrees in the counterclockwise direction (in a state of tilt 2). The reflecting light is not entered into the projection optical system but is absorbed by a black mask (not shown, light absorber such as a metal coated with black).

In this respect, in the case where the mirror element 1 is in the intermediate state, the incident light L1 is reflected in the direction of undesired light L4 in FIG. 1(a) by the mirror element 1. The reflecting light is not entered into the projection optical system but is absorbed by a black mask (not shown, light absorber such as a metal coated with black).

FIG. 1(b) is a schematic side view of the DMD. A reference character 4 designates a mirror arrangement region (expanding two-dimensionally) in which a large number of mirror elements 1 are arranged. In an actual projection type display, the incident light L1, the ON light L2 and the OFF light L3 are entered into and emitted from the whole mirror arrangement region 4. In FIG. 1(b), for the sake of simplification, the state of entrance and emission of the light is shown by one light beam. In this regard, a reference character 400 designates an optical deflector in which a large number of mirror elements 1, each of which can be independently set in the "ON" states and the "OFF" states, are two-dimensionally arranged in the mirror arrangement region 4.

A large number of mirror elements 1 which are two-dimensionally arranged in the mirror arrangement region 4 included in the optical deflector 400 are independently set in the "ON" states and the "OFF" states, whereby the incident light entered into the whole mirror arrangement region 4 is reflected as the ON light L2 and the OFF light L3 in correspondence with the "ON" states and the "OFF" states of the mirror elements 1.

In the case where a moving image is displayed by a projection type display, for example, the average intensity of the ON light L2 is determined by a ratio of the period of the "ON" state to the period of one field or one frame of an inputted image signal. Then, the moving image of gradation is displayed by changing the ratio of the period of the "ON" state to the period of one field or one frame of an inputted image signal.

In this respect, brightness of the whole screen in one field or one frame can be displayed by the number of mirror elements 1(area ratio) in the "ON" state of all the mirror elements 1 belonging to the mirror arrangement region 4.

The average ON ratio of the mirror elements 1 (which shows the utilization efficiency of the incident light L1) is defined as follows from the average intensity of the above-mentioned ON light L2 and the brightness of the whole screen.

That is, the average ON ratio P of the mirror elements 1 is defined as the following equation (1) in the period of one field or one frame (hereinafter referred to as on screen period).

$$P=\text{(the ratio of a time period during which the mirror elements 1 are in the "ON" state to one screen period)} \times \text{(the ratio of the mirror elements 1 in the "ON" state to all the mirror elements 1)} \quad (1)$$

For example, in the case where the mirror elements 1 are in the "ON" state in 20% of the area of the whole mirror arrangement region 4 (the whole screen) and the ratio of the time period during which the mirror elements 1 are in the "ON" state to one field period or one frame period is 50%, the average ON ratio P is given by $$P=0.5\times 0.2=0.1$$

This can be thought to be equivalent to that 10% of all the mirror elements 1 are in the "ON" state on the average. Therefore, assuming that both of the reflectance factor and the vignetting factor of the mirror element 1 are 100% (the mirror elements 1 produce no loss in the entrance or reflection of light) and that optical power of the incident light L1 is 100%, 10% of the optical power is projected to the screen as reflecting light L2 and remaining 90% of the optical power is made OFF light L3. Therefore, in this case, the utilization factor of the incident light L1 is 10%.

In the brightest portion of an image of high contrast (a Highlight portion in which luminance is at a maximum level; this luminance is referred to as peak luminance), 100% of the mirror elements 1 are in the "ON" state. In this case, ideally, the incident light L1 has the same light intensity as the ON light L2. That is, the maximum value of the ON light L2 is constant irrespective of the area ratio of the highlight portion and the image.

For example, in the case where it is intended to more brightly display an image of a large screen size of 200 inches, a conventional projection television needs a lamp or a light source of large power. This makes the device expensive and increases power consumption.

In actual ordinary image display, however, it is very rare that the average brightness (luminance level) of the image is always high. Further, in a movie or the like, there are many dark scenes and hence an average luminance level is low in many cases. Therefore, most of light generated by the lamp is made the OFF light L3 which is not projected to the screen, which reduces the utilization efficiency of light.

SUMMARY OF THE INVENTION

The present invention has been made to solve the above-mentioned problems. It is the object of the present invention to greatly increase the peak luminance on a screen of an image without increasing the power of a lamp by improving the utilization efficiency of light.

Another object of the present invention is to provide a light source device and a projection television capable of greatly increasing luminance even in an image display of average brightness.

Still another object of the present invention is to produce a stable color balance in an image display even if luminance is increased.

A device in accordance with the present invention mainly has an optical element for uniforming a light intensity distribution of the emitting light of a lamp in a plane perpendicular to the direction of propagation, an optical deflector for changeably reflecting the emitting light of the optical element into either one of two directions, and an optical reflector for reflecting light in said one of two directions, along an axis of said one of two directions.

This returns the reflecting light in the one direction of the two directions produced by the optical deflector to the lamp, which can increase the utilization efficiency of light, as described in detail in the following.

BRIEF DESCRIPTION OF THE DRAWINGS

The preferred embodiments of the present invention will be described in detail with reference to the following figures in which.

DESCRIPTION OF THE PREFERRED EMBODIMENTS

The present invention will be specifically described in the following based on the preferred embodiments thereof with reference to the figures.

(First Embodiment)

Figure 2:
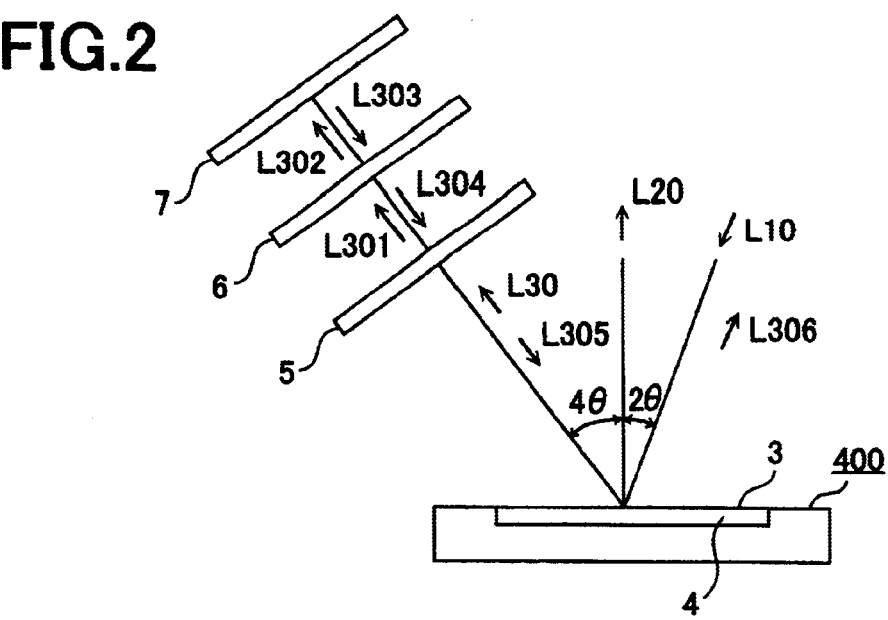
FIG. 2 is an illustration to show the optical path of a mirror element and optical elements in the vicinity thereof of a projection television of a preferred embodiment 1 in accordance with the present invention.

FIG. 2 is an illustration to show a mirror element and an OFF light reflecting unit of a projection television of a preferred embodiment 1 in accordance with the present invention. Here, for the sake of simplification, an optical system of monochromatic light will be described. Also, the description of the same members as the conventional ones will be omitted.

In FIG. 2, a reference character 5 designates a polarization converting element, a reference character 6 designates a liquid crystal shutter element, a reference character 7 designates a mirror, and reference characters L1, L2, and L3 designate incident light, ON light, OFF light, respectively.

The polarization converting element described in Japanese Patent Publication Laid-open No. 7-294906 and Japanese Patent Publication Laid-open No.11-183848 can be used as the polarization converting element 5 described above. The polarization converting element is an element for converting light having random polarization directions (non-polarized light) into light having one polarization direction.

The polarization converting element will be described in brief. The polarization converting element comprises a polarization beam splitter array in which polarization beam splitters having polarization separating films and prisms are alternately arranged. A lens array is added to the light entrance plane of the polarization beam splitter and a λ/2 phase plate is added to the light emission plane thereof.

The incident light having random polarization directions includes so-called s-polarized light and p-polarized light. The incident light entering the lens array enters polarization beam splitters arranged in correspondence with the individual lens portions.

The incident light is separated by the polarization separating film into the s-polarized light reflected by the polarization separating film and the p-polarized light transmitting through the polarization separating film. The reflected s-polarized light is refracted and emitted in the direction of emission of light by a neighboring prism.

Further, the transmitted p-polarized light is transmitted through the λ/2 phase plate provided on the light emission plane of the polarization beam splitter and is converted into s-polarized light and is emitted in the direction of emission of light.

Therefore, the incident light transmitting through the polarization converting element and having random polarization directions is converted into emitting light most of which is s-polarized light (if light having polarizing component in the first and second polarization directions enters, the polarizing component of the light is converted into a polarizing component in the first or second polarization direction).

Further, a reference character L301 designates light transmitted through the polarization converting element 5 (hereinafter referred to as transmitted light L301), a reference character L302 designates light transmitted through the liquid crystal shutter element 6 (hereinafter referred to as transmitted light L302), and a reference character L303 designates light reflected by the mirror 7 (hereinafter referred to as reflecting light L303).

A reference character L304 designates the light 303 after transmission through the liquid crystal shutter element 6 (hereinafter referred to as transmitted light L304), a reference character L305 designates the light 304 after transmission through the polarization converting element 5 (hereinafter referred to as transmitted light L305), and a reference character L306 designates the light 305 which is reflected by a light receiving plane 3 and propagates in the direction opposite to the direction of the incident light L10(that is, the respective mirror elements are arranged so that their surfaces reflect light in the direction of the OFF light L30, hereinafter referred to as reflecting light L306).

In this respect, these transmitted lights L301 and L302, the reflecting light L303, the transmitted light L304 and L305, and the reflecting light L306 are generated when the OFF light L30 is generated. When the ON light L20 is generated, these transmitted lights L301 and L302, the reflecting light L303, the transmitted lights L304 and L305, and the reflecting light L306 are not generated.

Operations will be described in the following. Light emitted from a lamp not shown (a monochromatic light source for emitting monochromatic light or a white light source for emitting white light including three primary colors (in the case of color display)) enters a light receiving plane 3 as incident light L10. The incident light L10 is separated into the ON light L20 and the OFF light L30 by the tilts of the individual mirror elements two-dimensionally arranged in the mirror arrangement region 4.

In the case where the ON light L20 is generated, the incident light L10 is reflected and polarized in the direction of the ON light L20 in the figure in the vicinity of the light receiving plane 3 and passes through the projection optical system and becomes a light point on a screen (not shown).

Further, in the case where the OFF light L30 is generated, the incident light L10 is reflected and polarized in the direction of the OFF light L30 in the figure in the vicinity of the light receiving plane 3 and enters the polarization converting element 5. Here, the mirror elements arranged in the mirror arrangement region 4 are not in the intermediate state but in the "ON" state or in the "OFF" state.

The polarization direction of the OFF light L30 is not constant. The polarization direction of the OFF light L30 basically includes two kinds of straight polarizing components of a first direction and a second direction perpendicular to the first direction (hereinafter simply referred to as a first polarizing component and a second polarizing component).

The polarization converting element 5 transmits the first polarizing component of the two kinds of polarizing components of the OFF light L30 as it is. Also, the polarization converting element 5 converts the second polarizing component into the first polarizing component.

Therefore, the transmitted light after the polarization converting element 5 makes the transmitted light L301 of a combination of the first polarizing component passing through the polarization converting element 5 as it is and the second polarizing component converted into the first polarizing component by the polarization converting element 5 (the polarization converting element 5 has a function of aligning the polarization directions).

The liquid crystal shutter element 6 has polarization transmitting filters for transmitting the first polarizing component on both faces thereof. The liquid crystal included in the liquid crystal shutter element 6 can change polarization rotating angle by a known control (for example, voltage control or the like).

Therefore, the liquid crystal shutter element 6 having the polarization transmitting filters for transmitting the first polarizing component on both planes thereof can change the light intensity of the transmitted light L302 transmitted the liquid crystal shutter element 6 by giving a control signal to the liquid crystal shutter element 6 from the outside.

That is, in the case where the liquid crystal shutter element 6 is in the state where it can transmit the first polarizing component with no loss, the transmitted light L301 entering the liquid crystal shutter element 6 is emitted as the transmitted light L302 without attenuation.

The mirror 7 reflects the transmitted light L302 entering the mirror 7 (this light is the reflecting light L303). Since the reflecting light L303 is the first polarizing component, it passes through the liquid crystal shutter element 6 (this light is the transmitted light L304).

Further, since the polarization converting element 5 transmits the first polarizing component, the transmitted light L304 is transmitted through the polarization converting element 5 (this light is the transmitted light L305).

The transmitted light L305 enters the light receiving plane 3 and is reflected thereby (this light is the reflecting light L306). The reflecting light L306 propagates in the direction of the lamp (not shown) which is opposite to the direction of the propagation of the incident light L10.

Figure 3:
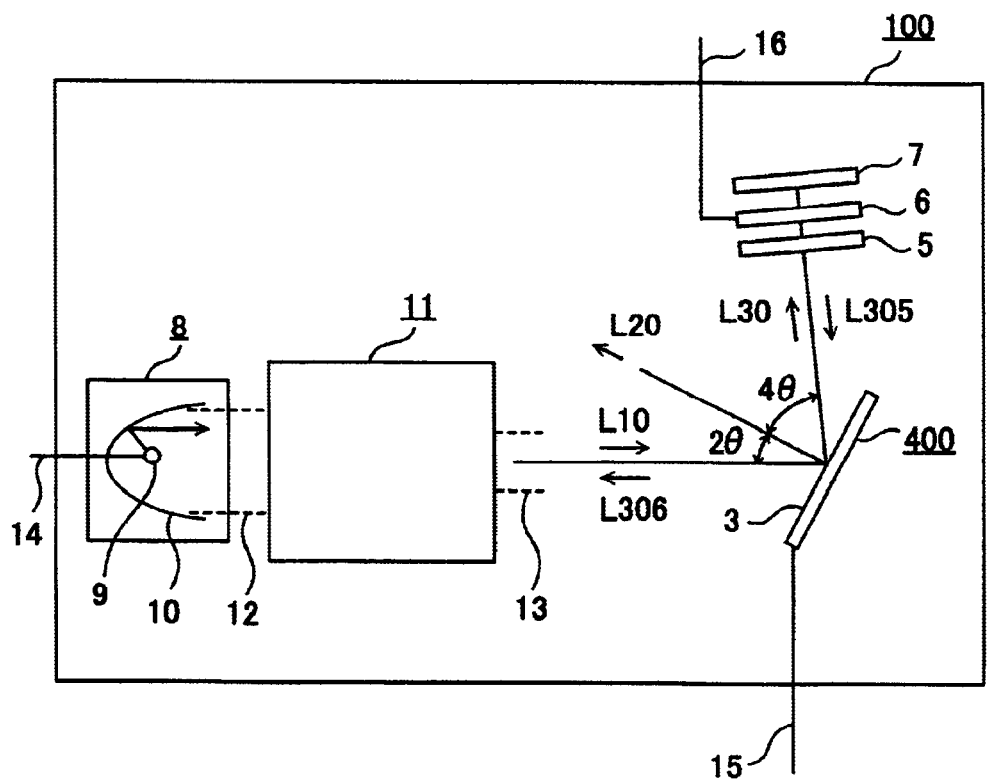
FIG. 3 is a configurational view to show the optical elements of a projection television of a preferred embodiment 1 in accordance with the present invention.

FIG. 3 is a configurational view to show the whole optical system of a projection television of the preferred embodiment 1 in accordance with the present invention.

In FIG. 3, a reference character 8 designates a lamp, a reference character 9 designates the light source of the lamp 8, a reference character 10 designates a reflecting plate for reflecting light emitted by the light source 9 provided in the lamp 8 in the right direction in the figure, a reference character 12 designates an emitting luminous flux emitted by the lamp 8. A reference character 11 designates a beam shaping optical system into which the emitting luminous flux 12 emitted by the lamp 8 is entered to change the diameter of the emitting luminous flux 12 (diameter of the emitting luminous flux 12 emitted by the lamp 8 when it is a circular luminous flux).

A reference character 13 designates the emitting luminous flux emitted by the beam shaping optical system 11 and a reference character 14 designates a driving signal for controlling the light emission of the light source 9.

A reference character 15 designates a driving signal for driving and/or controlling the individual mirror elements included in the optical deflector 400 and a reference character 16 designates a driving signal for driving and/or controlling the liquid crystal shutter element 6.

In this respect, a reference character 100 designates an optical unit and comprises the lamp 8, the beam shaping optical system 11, the light deflector 400, the polarization converting element 5, the liquid crystal shutter element 6 and the mirror 7.

The optical deflector 400, as described above, changeably reflects the emitting light in two directions. An optical reflector comprises the polarization converting element 5, the liquid crystal shutter element 6 and the mirror 7.

This optical reflector reflects the reflecting light (OFF light) emitted by the optical deflector 400 in one direction of the two directions (or the reflecting light is reflected in either one of two directions) in the one direction (The optical reflector for reflecting light reflected in said one of two directions, along an axis of said one of two directions. Accordingly, the reflecting light is returned to the light source).

In this respect, an optical system such as projection lens and the like provided in the part to which the ON light L20 is to be propagated and a screen to which an image is projected are not shown in the figure.

In a conventional projection type display, a metal halide lamp or an arc lamp which can emit strong light is used as a light source. In the configuration shown, for example, an arc lamp is used as the light source 9 included in the lamp 8.

In the case where the arc lamp is used as the light source 9, light is emitted from a micro point (light emitting point) in a space by a discharging arc. The reflecting plate 10 is constituted so as to reflect the light emitted by the light source 9 in a predetermined direction.

A parabolic mirror, for example, is used as the reflecting plate 10, and in the case where the parabolic mirror is used, by disposing the light emitting point of the light source 9 at the focal point of the parabolic mirror, the light emitted by the reflecting plate 10 is made the nearly parallel luminous flux 12.

The emitting luminous flux 12 emitted by the reflecting plate 10 enters the beam shaping optical system 11 as the emitting light from the lamp 8. In this case, the emitting luminous flux 12 makes a collimating luminous flux.

The beam shaping optical system 11 shapes the emitting luminous flux 12 emitted by the lamp 8 into an emitting luminous flux 13 having a diameter suitable for irradiating the light receiving plane 3 of the optical deflector 400. The beam shaping optical system 11 is constituted in the same way as an ordinary beam magnifying/diminishing unit for varying the diameter of the emitting luminous flux 12 by a desired magnification.

The emitting luminous flux 13 emitted by the beam shaping optical system 11 irradiates the light receiving plane 3 of the optical deflector 400 as the incident light L10 entering the optical deflector 400. The incident light L1 irradiating the light receiving plane 3 is the ON light L20 or the OFF light L30, as described above.

In the case where the OFF light L30 is generated, as described with reference to FIG. 2, the transmitted light L305 is generated as the returning light of the OFF light L30 entering the polarization converting element 5 by the operation of the polarization converting element 5, the liquid crystal shutter element 6 and the mirror 7 and enters the light receiving plane 3 of the optical deflector 400 (this generates the reflecting light L306).

Since the process from the entrance of the OFF light L30 into the polarization converting element 5 to the generation of the reflecting light L306 is conducted by a light speed, most of the mirror elements included in the optical deflector 400 are tilted to the angle to produce the OFF light L30.

Therefore, the reflecting light L306 is made returned to the vicinity of the light emitting point of the light source 9 by the beam shaping optical system 11 and the reflecting plate 10. The light returned to the vicinity of the light emitting point of the light source 9 is propagated back and forth on the above-mentioned propagation path comprising the reflecting plate 10, the beam shaping optical system 11, the optical deflector 400, the polarization converting element 5, the liquid crystal shutter element 6, and the mirror 7.

In this regard, the optical path from the lamp 8 to the optical deflector 400 of the configuration shown in FIG. 3

(which are arranged in the beam shaping optical system 11 in the actual configuration) includes an optical element shaped like a column or having a reflecting wall on the inner surface of a hollow space.

This optical element is provided so as to uniform the light intensity of the emitting luminous flux 12 or 13 in a plane normal to an optical axis (these are described in detail, for example, in U.S. Pat. Nos. 5,625,738, 5,634,704, 507,613). That is, this optical element is a light uniforming element. The light uniforming element is used for uniforming the light intensity of the emitting light of the lamp 8 in the plane normal to the propagation direction of the emitting light.

As described in the above-mentioned U.S. Patents, for example, in the optical element shaped like a column, the incident light satisfies the total reflection conditions on the outer surface of the column-shaped optical element and is repeatedly reflected plural times in the optical element.

In this manner, the emitting light from the end face of the emitting side of the optical element is emitted in the state in which the intensities of a lot of light entering the optical element are mixed, whereby the light intensity distribution is made uniform in a plane normal to the optical axis.

Further, in the optical element having the reflecting wall on the inner surface of the hollow space, light is repeatedly reflected plural times in the hollow space.

These operations makes the light intensity distribution of the emitting light of the light entering the optical element uniform in a plane normal to the optical axis.

The light returning to the vicinity of the light emitting point of the light source 9 is made uniform by this unit for making light intensity uniform. Accordingly, in addition to the mirror elements included in the optical deflector generating the OFF light, the light returning to the vicinity of the light emitting point is applied also to the mirror elements generating the ON light (the returned OFF light is utilized as the ON light.)

According to this configuration, the light returning to the vicinity of the light emitting point of the light source 9 is again utilized in the optical unit 100. Therefore, the light intensity in the vicinity of the light emitting point of the light source 9 in this configuration is made larger than that in the configuration in which the reflecting light L304 is not returned to the vicinity of the light emitting point of the light source 9 (this is because the returned light is added to light newly emitted by the light source 9).

If the operation to be accomplished by the configuration described above is utilized, desired light can be obtained without increasing light newly emitted by the light source 9. Further, desired light intensity can be obtained even if light newly emitted by the light source 9 is reduced as compared with the conventional configuration.

Figure 4:
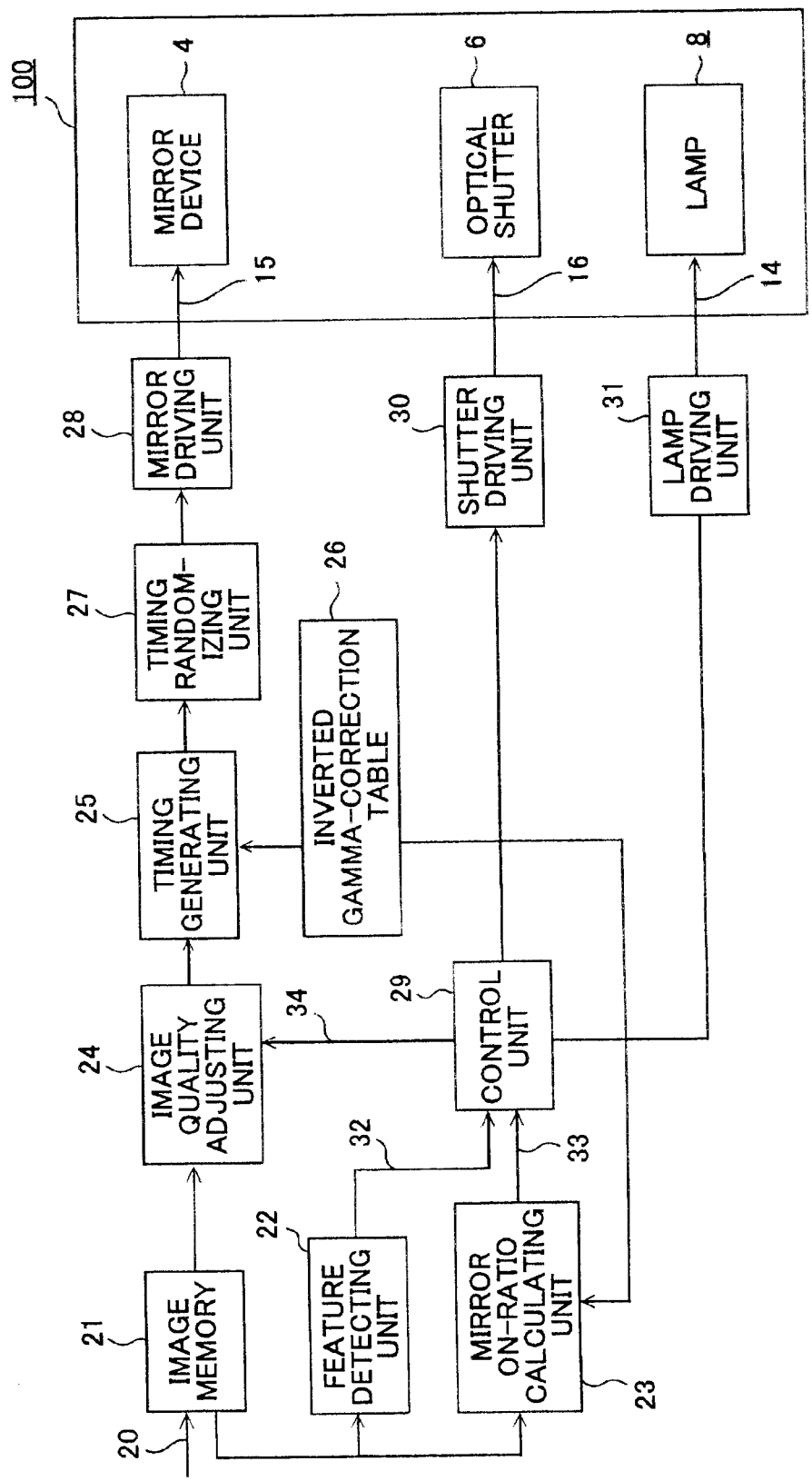
FIG. 4 is a functional block diagram to show the signal processing of a projection television of a preferred embodiment 1 in accordance with the present invention.

FIG. 4 is a functional block diagram to show a signal processing unit for processing the signal of the projection television of the preferred embodiment 1 in accordance with the present invention.

In FIG. 4, a reference character 20 designates a television image signal, a reference character 21 designates an image memory (memory unit) for storing image information of one frame/field (one screen) of the image signal, a reference character 22 designates a feature detecting unit for detecting the features of an image such as a maximum value, a minimum value, an average value and the like of the luminance level of the television image signal 20, and a reference character 23 designates a unit for calculating the average ON ratio P in the optical deflector 400. In this case, the average ON ratio P is a ratio of the ON period of the average light on the display screen to a predetermined period when the display screen is displayed in sequence of time.

A reference character 24 designates an image quality adjusting unit for adjusting an image quality, a reference character 25 designates a timing generating unit for generating ON/OFF timings to drive the mirror elements in the optical deflector 400, and a reference character 26 designates an inverted gamma-correction table for correcting the beam current characteristics of a CRT.

A reference character 27 designates a timing randomizing unit for varying ON/OFF timings for the respective mirror elements in the optical deflector 400 and a reference character 28 designates a mirror driving unit for driving the mirror elements in the optical deflector 400.

A reference character 29 designates a control unit for outputting a control signal based on the output of the average on ratio calculating means 23 for adjusting an image quality and driving a shutter and a lamp.

A reference character 30 designates a shutter driving unit, a reference character 31 designates a lamp driving unit, a reference character 32 designates a feature signal for representing the features of the image, a reference character 33 designates an ON ratio P signal for representing an ON ratio P in the optical deflector 400, and a reference character 34 designates an image quality adjusting controlling signal applied to the image quality adjusting unit 24.

Operations will be described in the following.

The image memory 21 stores an inputted television image signal 20 as a digital signal (image data) per one frame/field (one screen).

The image data stored in the image memory 21 is outputted to the feature detecting unit 22 and the average ON ratio calculating unit 23. The feature detecting unit 22 detects the features of the image such as the maximum value, the minimum value, the average value and the like of a luminance level in the inputted image data.

The average ON ratio calculating unit 23 reads out a coefficient necessary for performing an inverted gamma correction corresponding to the luminance levels of the respective pixels in the inputted image data from the inverted gamma-correction table 26 to perform the inverted gamma correction. Then, the average ON ratio calculating unit 23 calculates an average ON ratio P in the optical deflector 400 based on the corrected image data.

The image quality adjusting unit 24 reads out the image data stored in the image memory 21 and adjusts (corrects) the image date so as to make it a desired image quality. Then, the image quality adjusting unit 24 outputs image data after an image quality adjustment to the timing generating unit 25.

The timing generating unit 25 reads out a coefficient necessary for performing the inverted gamma correction corresponding to the luminance levels of the respective pixels in the inputted image data from an inverted gamma-correction table 26 and performs the inverted gamma correction.

In addition, the timing generating unit 25 generates and outputs a timing signal for setting the individual mirror elements included in the optical deflector 400 in the "ON" state based on the image data subjected to the inverted gamma correction.

The timing signal outputted by the timing generating unit 25 is inputted to the timing randomizing unit 27 where the inputted timing signal is subjected to a shift operation on a time axis to make a new timing signal such that it provides a different timing between pixels and is outputted.

The new timing signal outputted by the timing randomizing unit 27 is inputted to a mirror driving unit 28. The mirror driving unit 28 outputs a driving signal for driving the mirror elements included in the optical deflector 400 based on the new timing signal to drive the mirror elements.

A feature signal 32 and an average ON ratio P signal 33 are inputted to the control unit 29. The control unit 29 outputs control signals to the shutter driving unit 30 and the lamp driving unit 31 based on these inputted signals. Further, the control unit 29 outputs an image adjusting controlling signal 34 to the image adjusting unit 24.

The optical deflector 400, the optical shutter 6 and the lamp 8 which are included in the optical unit 100 are driven, respectively, as described above.

The operation of the timing randomizing unit 27 will be further described in detail with reference to FIG. 5.

Figure 5:
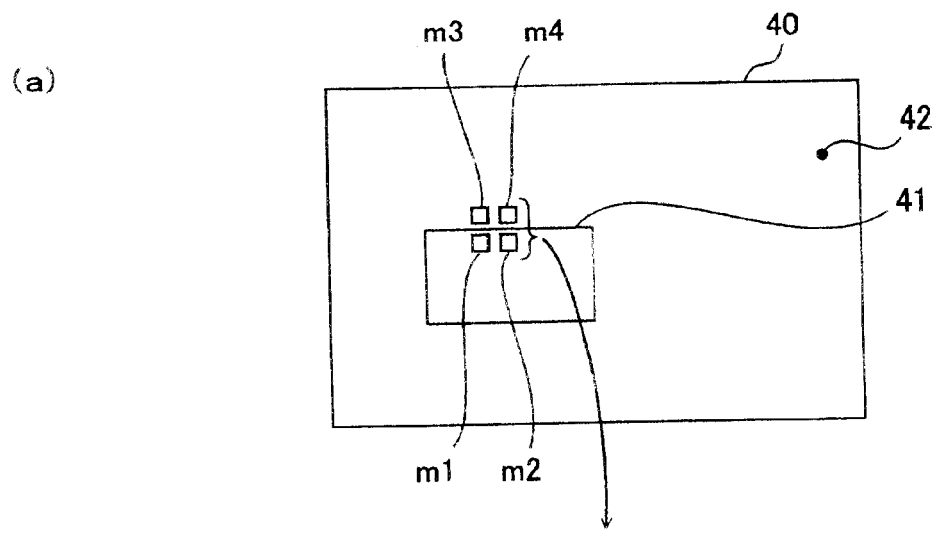
FIG. 5 is an example of a screen display and an enlarged view of display pixels of a projection television of a preferred embodiment 1 in accordance with the present invention.
Figure 5:
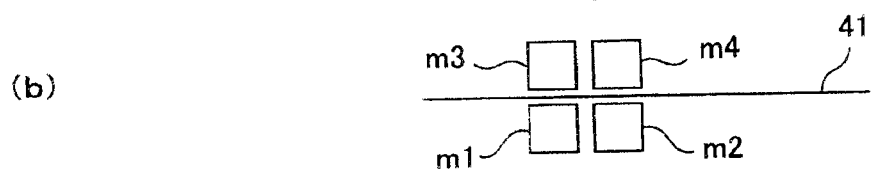
Figure 5:
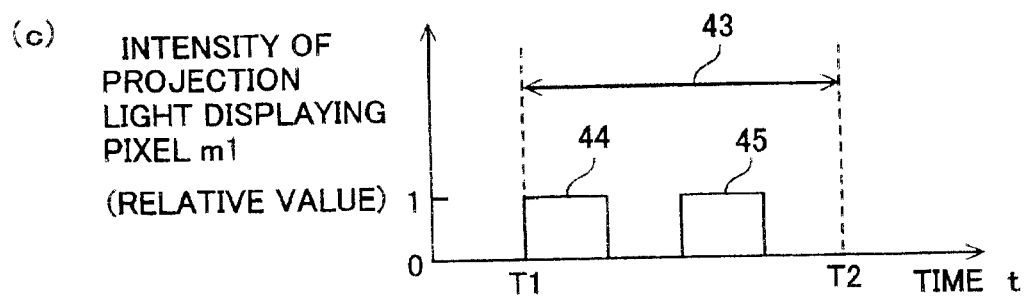
Figure 5:
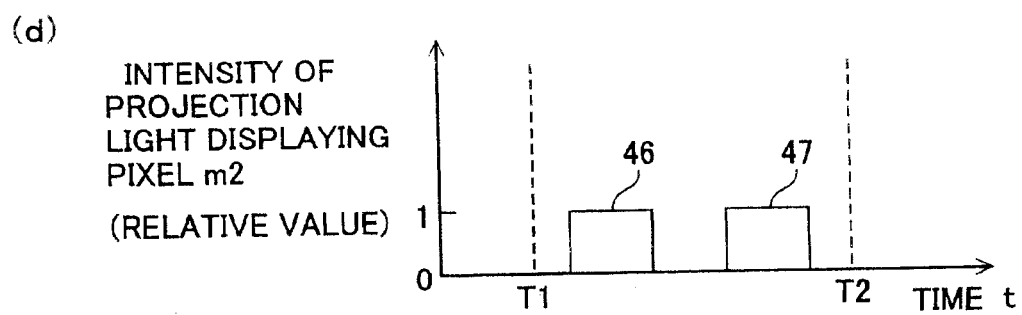

FIG. 5 shows the relationship between one example of a screen display of a projection type display and mirror elements. In FIG. 5($a$), a reference character 40 designates a display screen and a reference character 41 designates a rectangular bright portion displayed near the center of the display screen 40 as one example of the display of the display screen 40.

A reference character 42 designates a portion which is displayed outside the bright portion 41 and is darker than the bright portion 41.

Further, reference characters m1 and m2 shown in FIG. 5($b$) are bright pixels which are in the vicinity of the boundary of the bright portion 41 and the dark portion 42 and are included in the bright portion 41. Reference characters m3 and m4 are dark pixels which are in the vicinity of the boundary of the bright portion 41 and the dark portion 42 and are included in the dark portion 42 (description will be made assuming that the bright pixels m1 and m2 have the same brightness and the dark pixels m3 and m4 have the same brightness).

Here, the words "bright" and "dark" mean that in the case where the brightness of displayed pixels are compared with each other, a relatively bright pixel is called a bright pixel and a relatively dark pixel is called a dark pixel.

In this respect, for the sake of simplification, the following assumption will be made. That is, the assumption will be made that mirror elements 1 corresponding to the dark pixels m3 and m4 are in the "OFF" state and that a ratio of a time period during which the mirror elements 1 corresponding to the bright pixels m1 and m2 are in the "ON" state to one screen period is 50%.

FIG. 5($c$) and ($d$) are examples of the driving state into which the mirror elements 1 corresponding to the respective bright pixels m1 and m2 are brought (in FIG. 5($c$) and ($d$), a vertical axis represents projection light intensity (relative value) displaying the respective pixels and a lateral axis represents time, respectively).

Reference characters T1 and T2 represent a starting time and an ending time of one screen period. A reference character 43 designates one screen period and if the mirror elements 1 are in the "ON" state in this period, a ratio of a time period during which the mirror elements 1 are in the "ON" state to one screen period is 100%.

Reference characters 44, 45, 46, and 47 represent time periods during which the mirror elements 1 corresponding to the respective pixels m1 and m2 are in the "ON" state.

In the case of FIG. 5($c$) and ($d$), as described above, the assumption is made that the time periods during which the mirror elements 1 are in the "ON" state (that is, the sum of the time periods 44 and 45, and the sum of the time periods 46 and 47) are 50% of one screen period.

Here, the time periods 44 and 45 are different in timing on a time axis from the time periods 46 and 47, as shown in the figures. Different timings can be given to arbitrary two pixels in the same way.

Here, as shown in the figures, the above-mentioned different timings are given to two time periods in one screen period such as the periods 44 and 45, and the periods 46 and 47. However, this is not limited to two time periods in one screen period (the number of time periods in one screen periods may be three or more).

The timing randomizing unit 27 varies ON timings for the respective mirror elements. Usually, as to pixels constituting a screen, a screen in one screen period is represented by several hundred thousand pixels (corresponding to the total number of the mirror elements 1 in the case where the mirror elements 1 included in the optical deflector 400 are two-dimensionally arranged).

Therefore, the timing may be determined at any time period or timing if the timing can reduce a variation in the average ON ratio P during one screen period.

In the above-mentioned preferred embodiment, it has been described that the light intensity of the incident light L10 can be substantially increased by returning light emitted by the lamp 8 to the lamp 8. In the following, this will be further described in a quantitative aspect.

Figure 6:
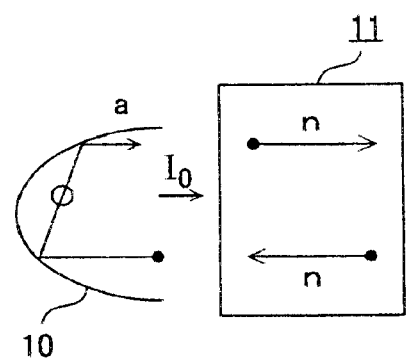
FIG. 6 is an illustration to show a light transfer rate of the respective optical elements of a projection television of a preferred embodiment 1 in accordance with the present invention.
Figure 6:
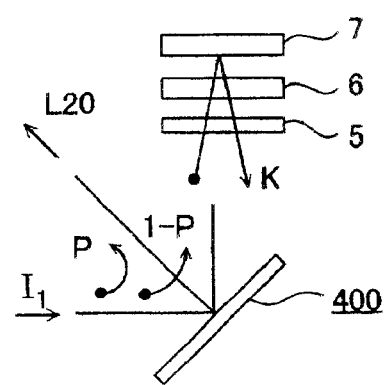
Figure 6:
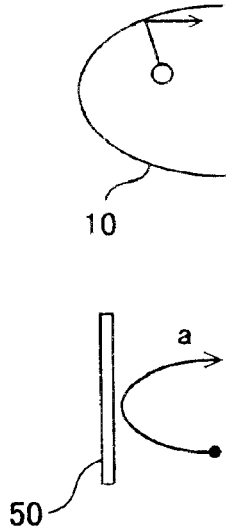
Figure 6:
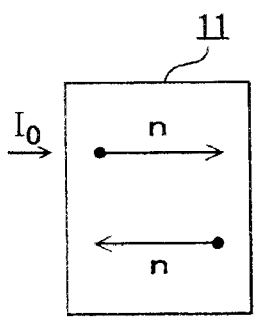

FIG. 6 shows the transfer of light in the configuration of the optical unit 100 shown in FIG. 3. In FIG. 6, a reference character a designates the reflectance factor of a reflecting plate 10, a reference character n designates the light transfer rate of the beam shaping optical system 11, and a reference character P designates the average ON ratio of the optical deflector 400.

A reference character K designates a ratio that the OFF light emitted by the mirror elements 1 of the optical deflector 400 passes through the polarization converting element 5, the liquid crystal shutter element 6 and the mirror 7 and returns to the mirror elements 1 of the optical deflector 400. In the case where such a liquid crystal shutter element 6 is used, the ratio K can be, controlled by changing a polarizing angle by the liquid crystal shutter element 6.

A reference character $I_0$ designates a light intensity emitted by the light source 9 of the lamp 8 (that is, the intensity of light generated by the light source 9 and not including the intensity of light returning to the light source 9) of the emitting luminous flux 12 shown in FIG. 3. A reference character $I_1$ designates the intensity of light emitted by the light source 9 of the lamp 8 and passing through the beam shaping optical system 11 (that is, the intensity of light generated by the light source 9 and not including the intensity of light returning to the light source 9 and passing through the beam shaping optical system 11) of the emitting luminous flux 13 shown in FIG. 3.

Considering the whole optical unit 100, light corresponding to the average ON ratio P of the light intensity $I_1$ is the ON light L20. The ON light L20 is projected to the screen by the projection optical system disposed after the optical deflector 400.

When the average ON ratio is P, the ratio of the OFF light L30 is given by 1−P. The OFF light L30 is returned to the mirror elements 1 of the optical deflector 400 at the ratio K by the polarization converting element 5, the liquid crystal shutter element 6 and the mirror 7 by the operation described above.

In this respect, in this case, the optical position and arrangement of the optical deflector 400 are adjusted so that the OFF light of the mirror elements 1 is returned to the mirror elements 1 in the OFF state of the optical deflector 400.

This arrangement returns the OFF light to the vicinity of the light emitting point of the light source 9 of the lamp 8 via the beam shaping optical system 11 by the operation described above.

Letting a ratio that the emitting luminous flux 13 having a light intensity $I_1$ returns to the light source 9 be m, the ratio m is expressed by the following equation by the use of the average ON ratio P and ratio K.

$$m = (1-P) \times K$$

FIG. 6(b) is an illustration in which the propagation of the OFF light is simplified. Simplifying the optical system from the light source 9 to the mirror 7, in this optical system, the reflecting plate 10 and the mirror 7 can be regarded as an optical system including two opposed mirrors having certain light transfer rates. This is shown in FIG. 6(b).

In FIG. 6(b), a reference character 50 designates a mirror having a reflectance factor a corresponding to the reflecting plate 10, a reference character 51 designates a mirror having a reflectance factor m (equivalent to the ratio m described above) corresponding to the mirror 7.

The light in the optical system shown in FIG. 6(a), like the simplified configuration shown in FIG. 6(b), propagates back and forth between the mirrors 50 and 51 via the beam shaping optical system 11 sandwiched between the mirrors 50 and 51.

In FIG. 6(b), a reference character $I_r$ designates the intensity of light propagating back and forth r times between the mirrors 50 and 51. This light intensity $I_r$ is derived from the study of the r-time propagation of light between the mirrors 50 and 51. The light intensity $I_r$ is expressed by the following equation (1) (which is expressed by a geometric progression having an initial term of $I_0 \cdot n$ and a common ratio $a \cdot m \cdot n^2$)

$$\begin{aligned}
I_1 &= I_0 \cdot n \\
I_2 &= I_1 \cdot m \cdot n \cdot a \cdot n \\
&= I_1 \cdot a \cdot m \cdot n^2 \\
I_3 &= I_2 \cdot (a \cdot m \cdot n^2) \\
&= I_1 \cdot (a \cdot m \cdot n^2) \\
I_r &= I_{r-1} \cdot (a \cdot m \cdot n^2) \\
&= I_1 \cdot (a \cdot m \cdot n^2)^{r-1}
\end{aligned} \quad \text{EQUATION (1)}$$

Further, the light intensity I caused by the round propagation of light can be calculated by assuming that the number of the round propagations r is infinite, that is, can be calculated as shown in the following equation (2) by calculating the sum of the infinite series shown by the above equation (1) (can be expressed by the sum of infinite series having an initial term of $I_0 \cdot n$ and a common ratio $a \cdot m \cdot n^2$).

$$\begin{aligned}
I &= \sum_{r=1}^{\infty} I_r = \\
I_1 &\cdot \{1 + a \cdot m \cdot n^2 + (a \cdot m \cdot n^2)^2 + \ldots\}(a \cdot m \cdot n^2) \cdot I = \\
I_1 &\cdot \{a \cdot m \cdot n^2 + (a \cdot m \cdot n^2)^2 + \ldots\} \\
(1 - a \cdot m \cdot n^2) \cdot I &= I_1 \\
I &= I_1 / (1 - a \cdot m \cdot n^2)
\end{aligned} \quad \text{EQUATION (2)}$$

An increase rate of the light intensity I with respect to the light intensity $I_1$ can be calculated by dividing both side of the equation (2) (here, $m = (1-P) \cdot K$) by the light intensity $I_1$, as shown by the following equation (3).

$$I/I_1 = 1/(1 - a \cdot (1-P) K \cdot n^2) \quad \text{EQUATION (3)}$$

Figure 7:
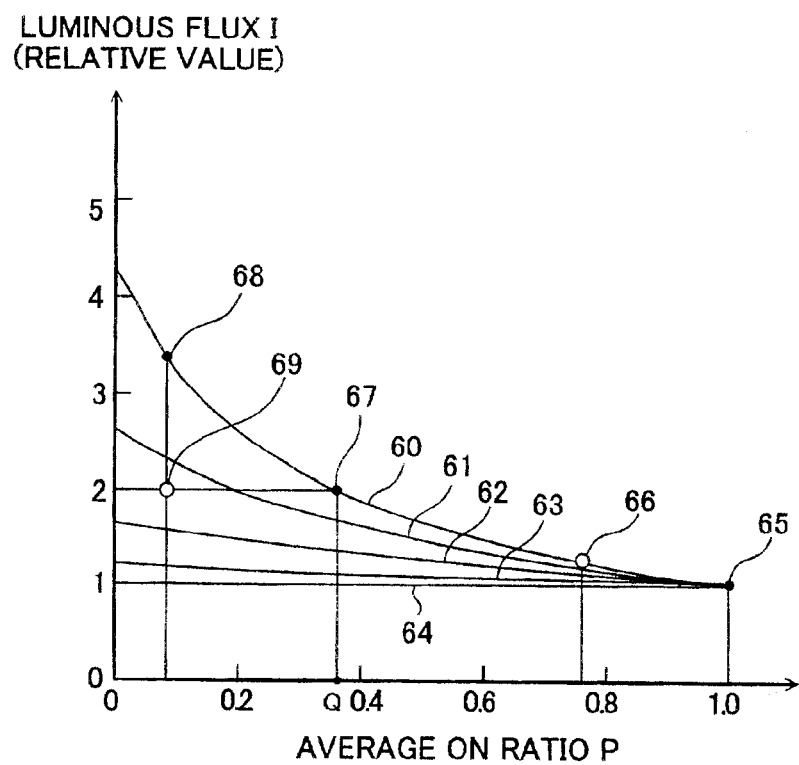
FIG. 7 is an illustration to show an operation in which a control unit of a projection television of a preferred embodiment 1 in accordance with the present invention controls the incident luminous flux I of a projection type light modulating element.

Letting the average ON ratio P be a variable and a ratio K be a parameter, the equation (3) are calculated as shown in FIG. 7.

In FIG. 7, a lateral axis designates an average ON ratio P and a vertical axis designates a light intensity I. In FIG. 7, curves 60 to 63 show variations in the light intensity I in the case where the reflectance factor a of the mirror 50 is 0.95 and a light transfer rate of the beam shaping optical system 11 is 0.9 and a ratio K is varied 1.0, 0.8, 0.5 and 0.2, respectively. A reference character 64 designates the light intensity I in the case the OFF light is not returned to the light source 9.

A reference character 65 designates a point of the light intensity I in the case where the average ON light P is 100% (that is, the OFF light is not emitted). Reference characters 66 to 68 designate points of the light intensity I when the ratio K is 1 and the average ON light P is varied about 0.75, 0.375 and 0.075.

A reference character 69 designates a point of the light intensity I in the case where the light intensity at the point 68 is reduced by adjusting the liquid crystal shutter element 6 (by reducing a light transmission rate) to reduce the ratio K to about 0.65 (the light intensity I is expressed by a relative intensity in which when the average ON ratio P is 100% (average ON ratio P=1), the light intensity I=1).

As can be seen from the curve 60, the light intensity I gradually decreases as the average ON ratio P increases and becomes 1 when the average ON ratio P becomes 100% (point 65 in FIG. 7).

In the case where the average ON ratio P is 100%, when all the reflecting light of the incident light to the optical deflector 400 are the ON light, light intensity=1. In this case, there is no OFF light (that is, no light returns to the vicinity of the light emitting point of the light source 9).

When the average ON ratio P is about 0.375, the light intensity I becomes 2 (point 67 in FIG. 7). In this state, the intensity of the incident light when the OFF light returning to the vicinity of the light emitting point of the light source 9 again enters the optical deflector 400 is 2 times the light intensity when the average ON ratio P is 100%.

When the average ON ratio P is further reduced to about 0.075, the light intensity I becomes 3.5 (point 68 in FIG. 7). In this state, the intensity of the incident light when the OFF light returning to the vicinity of the light emitting point of the light source 9 again enters the optical deflector 400 is 3.5 times the light intensity when the average ON ratio P is 100%.

In order to display an image with high fidelity, ideally, it is desirable that the brightness of a screen is never varied. From this viewpoint, for example, in a CRT type television, in the case of an image having an average luminance higher than an ordinary luminance level, the beam current of the CRT is limited to limit the luminance of the image.

Accordingly, also in a projection type display like a projection television, if the projection type display can stably display an image of the ordinary average luminance level, it can be thought to have a sufficient performance.

In the case where the average ON ratio P is equal to or smaller than a required value Q corresponding to required light intensity I=2, in FIG. 7, regarding the image as having an almost average luminance, stabilizing the light intensity at 2 can be realized by controlling the ratio K.

Conversely, in the case where the average ON ratio P is larger than the required value Q, by maximizing the ratio K, the light intensity I with respect to the average ON ratio P is gradually varied (limited) along the curve 60 shown in FIG. 7.

This can make the limit characteristics of the luminance similar to those of the CRT type television. Here, the required value Q can be determined based on the quality of the image and the extent to which the light intensity I is to be increased.

Into the control unit 29 in FIG. 4 are inputted the average ON ratio P signal 33 outputted by the average ON ratio calculating unit 23 and the feature signals 32 outputted by the image feature detecting unit 22 and including the maximum value Vmax, the minimum value Vmin, and the average value Vave of the luminance levels of the respective pixels which indicate the features of the image.

The control unit 29 compares the initial value Q0 of the required value Q which is previously stored therein with the respective average ON ratio P signals 33 inputted and outputs various kinds of control signals according to the characteristics of the image.

When the value given by the average ON ratio P signal 33 is smaller than the initial value of the average ON ratio P, the control unit 29 outputs a control signal to control the ratio K so that the shutter driving unit 30 for driving the liquid shutter element 6 makes the light intensity I constant.

In addition, in the case where the difference between the maximum value Vmax and the minimum value Vmin of the luminance levels of the respective pixels included in the feature signal 32 is close to the difference between the maximum luminance and the minimum luminance of the image, the image is judged as having a high contrast and the above required initial value Q0 is changed into a required value Q1 smaller than the initial value Q0.

According to the change of the initial required value Q0 to the required value Q1, the control unit 29 gives a control signal to increase the contrast of the image to the image quality adjusting unit 24 to increase the extent of the increase of the light intensity I.

In this respect, the control unit 29 controls the luminance levels of the respective pixels so that they keep the average luminance level Vave thereof during at least from several fields to several frames. When the control unit 29 judges that the average luminance level Vave is small during from several fields to several frames, it judges that the OFF light is much generated to set the ratio K at a value close to the maximum value and gives a control signal for reducing the brightness of the lamp 8 to the lamp driving unit 31.

The case where the average luminance level Vave is very small corresponds to the case where the average ON ratio P shown in FIG. 7 is almost zero. Therefore, the light intensity I can be increased by a factor of about 4 by setting the ratio K at the maximum value.

Controlling the light intensity I generated by the lamp 8 to half in this state is equivalent to controlling the light intensity I to two times.

In this respect, needless to say, the values of the reflectance factor a of the reflecting plate 10, the light transfer rate n of the beam shaping optical system 11, the average ON ratio P of the optical deflector 400, and the ratio K, which have been described up to this point, vary with the optical parts constituting the optical system.

There may be various choices in the optical parts used in the optical systems. For example, it is not always necessary that the ratio K can vary from 1 to 0. That is, in the example shown in FIG. 7, if the ratio K is larger than about 0.6, the increase rate of the light intensity I can be made 2.

Further, even when the ratio K can not be increased, if a part of OFF light is entered into the liquid crystal shutter element 6 and the other part of OFF light is reflected by a mirror having a high reflectance factor, the ratio K can be substantially increased.

In this respect, as to the response speed of the liquid crystal shutter element 6, a liquid crystal shutter element which can be operated within a few milliseconds has been put into practical use. Therefore, it is possible to control the ratio K for each video field/frame time period (about $16/32$ millisecond).

(Preferred Embodiment 2)

The preferred embodiment 2 in accordance with the present invention has the following features as compared with the above-mentioned preferred embodiment 1. Here, the description of the same configuration and operation as the preferred embodiment 1 will be omitted.

Figure 8:
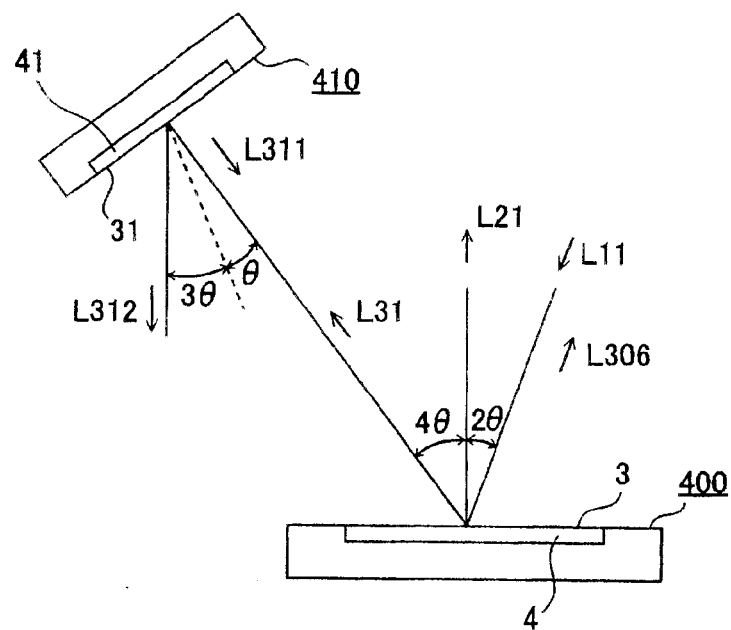
FIG. 8 is an illustration to show the optical path of a mirror element and optical elements in the vicinity thereof of a projection television of a preferred embodiment 2 in accordance with the present invention.

FIG. 8 is an illustration to describe a mirror element and an OFF light reflector of a projection television in a preferred embodiment 2 in accordance with the present invention. Here, for the sake of simplification, a monochromatic optical system will be described. The description of the same things as the conventional one or the preferred embodiment 1 will be omitted.

In FIG. 8, a reference character 410 designates a second optical deflector, a reference character 31 designates an incident plane of the second optical deflector 410, a reference character L11 designates an incident light, a reference character L21 designates an ON light, a reference character L31 designates an OFF light, a reference character L311 designates a reflecting light reflected by the second optical deflector 410 and propagating in the direction opposite to the direction of the OFF light L31.

Figure 1:
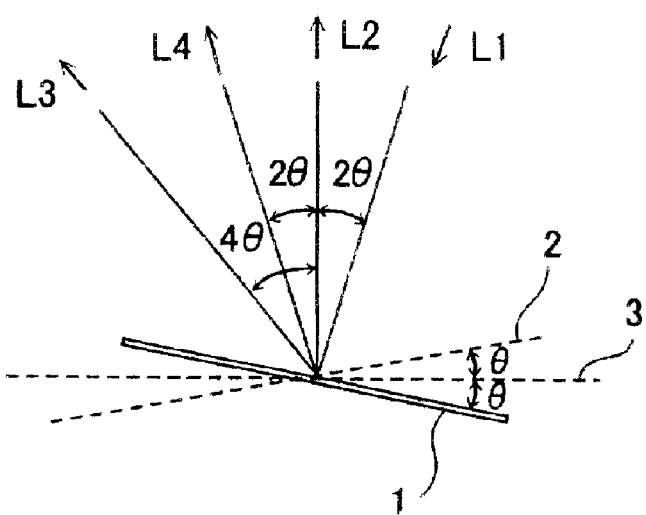
FIG. 1 is an illustration to show an optical path of a unit mirror element constituting a reflection type light modulating element.
Figure 1:
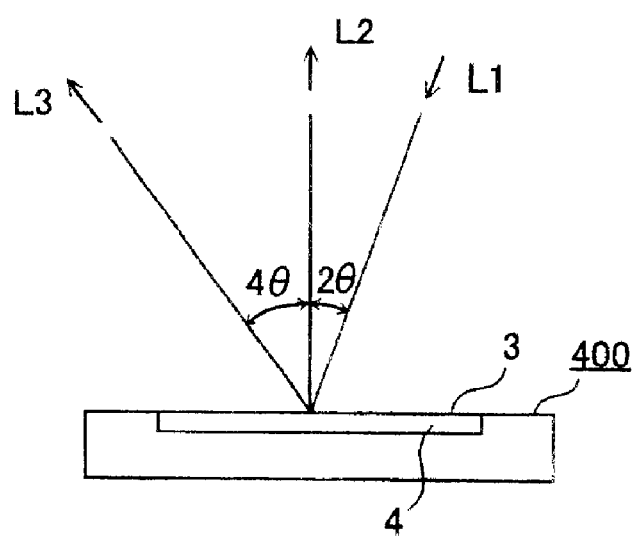

A reference character L312 designates a reflecting light reflected by the second optical deflector 410 and not propagating in the direction opposite to the direction of the OFF light L31 (OFF light from the second deflector 410). The configuration and the operation of the second deflector 410 are the same as those previously described with reference to FIG. 1(a).

As shown in FIG. 8, the incident light L31 enters the incident plane of the second deflector 410 at an angle θ with respect to a direction perpendicular to the incident plane. When the mirror elements of the second optical deflector 410 are tilted at the angle θ in the anticlockwise direction in the figure (the mirror elements of the second optical deflector 410 are in the ON state), the reflecting light L311 is generated as a reflecting light with respect to the incident light L31.

When the mirror elements of the second optical deflector 410 are tilted at the angle θ in the clockwise direction, the reflecting light L312 tilted at an angle 3θ in the clockwise direction with respect to the direction perpendicular to the incident plate of the second optical deflector 410 is emitted as reflecting light with respect to the incident light L31 (the mirror elements of the second optical deflector 410 are in the OFF state).

Therefore, by controlling the ratio of the mirror elements in the ON state of the second optical deflector 410, the ratio of the reflecting light L311 to the incident light L31 (or, the ratio of the reflecting light to the light source 9) can be controlled. Here, the reflecting light L312 of the second optical deflector 410 is absorbed by a black mask or the like.

Here, the second optical deflector 410 is not always required to be of the same shape as the optical deflector 400, but light collecting unit such as a collective lens or the like may be provided in the optical path through which the incident light L31 propagates.

This makes it possible to use the second optical deflector 410 which has a small number of mirror elements and hence is small in size and inexpensive.

Assuming that a optical deflector having the same shape as the optical deflector 400 is used as the second optical deflector 410, even if the second optical deflector 410 has about 1% of defective elements, there is no problem in practice.

The second optical deflector 410 is driven in the same way as the optical deflector 400 by the same configuration (not shown) as drives the optical deflector 400, as described with reference to FIG. 4, the configuration including the timing generating unit 25, the timing randomizing unit 27 and mirror driving unit 28.

Further, since the second optical deflector 410 is not related to an image itself projected to the screen, it is essential only that the mirror elements are changed between the ON state and the OFF state for each one field time period or one frame time period and the states of the mirror elements are not required to be changed at high speeds which are required in the display of the pixels.

According to the present preferred embodiment 2, since the OFF light from the optical deflector 400 does not propagates back and forth through an optical path including the polarization converting element 5 and the liquid crystal shutter element 6, it causes a small loss of light. Therefore, it is possible to increase the ratio of light returning to the light source 9 as compared with the preferred embodiment 1.

In the present preferred embodiment, the optical reflector in the preferred embodiment 1 is constituted of the second optical deflector 410.

That is, the optical reflector in the present preferred embodiment is constituted such that it changeably reflects the incident light to the optical reflector into two directions and that the reflecting light (OFF light) in one direction of the two directions from the optical deflector 400 is reflected in the direction of the incident light.

This produces an advantage that the second optical deflector 410 is not required to be arranged relatively to the optical deflector 400 with high accuracy, and the like.

(Preferred Embodiment 3)

Figure 9:
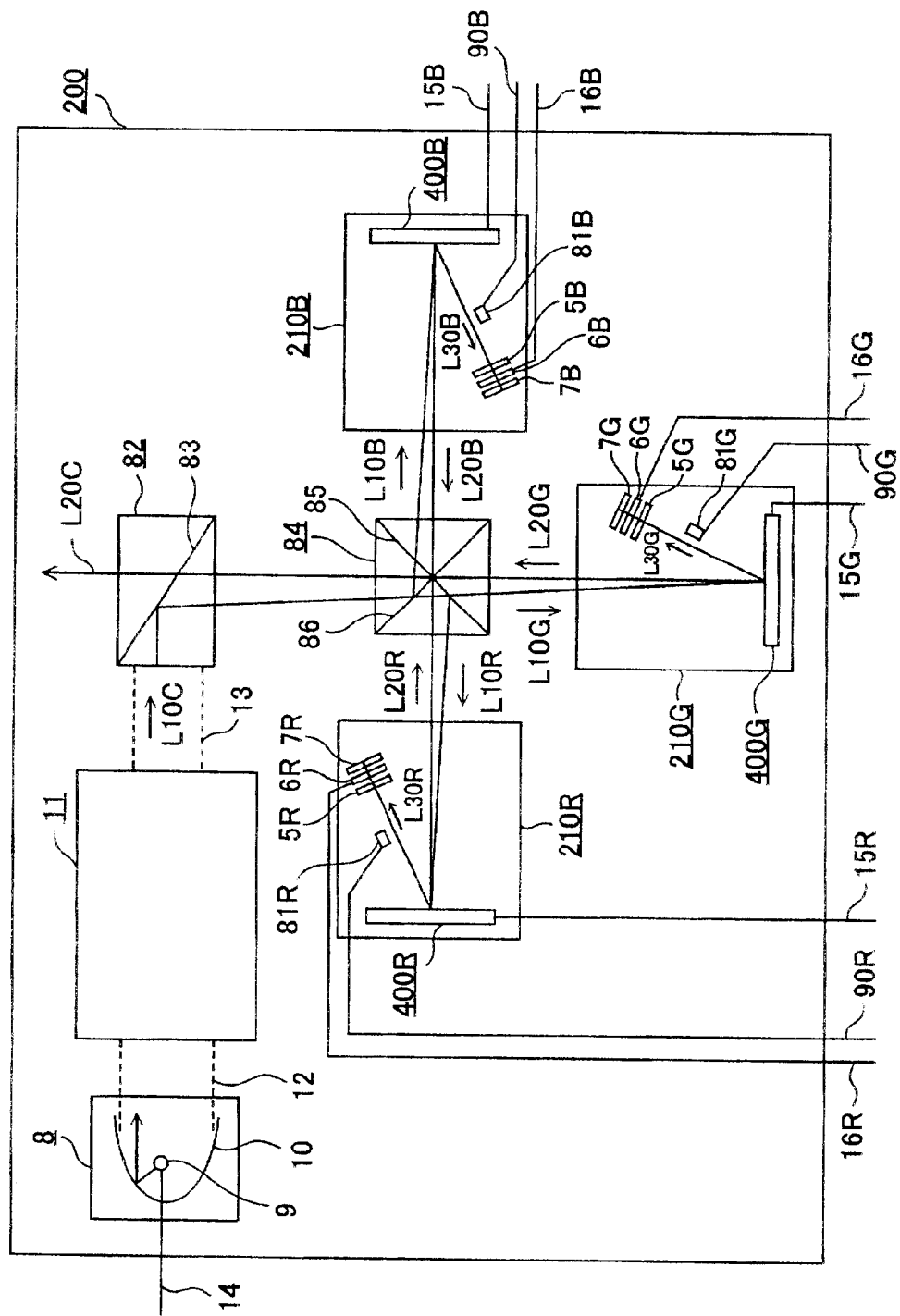
FIG. 9 is a functional block diagram to show the optical elements of a projection television of a preferred embodiment 3 in accordance with the present invention.

FIG. 9 is a configurational view to show the general optical system of a color type projection television of a preferred embodiment 3 in accordance with the present invention. Here, in the present preferred embodiment, the description of the same configuration and operation as the above-mentioned preferred embodiments will be omitted.

In FIG. 9, a reference character 200 designates an optical unit, a reference character 82 designates a total reflecting prism, a reference character 83 designates the reflecting plane of the total reflecting prism 82, a reference character 84 designates a color separating prism (dichroic prism, color separating element, which separates white light into a plurality of color lights), a reference character 85 designates the red reflecting plane of the color separating prism 84, and a reference character 86 designates the blue reflecting plane of the color separating prism 84.

Reference characters 210G, 210R, and 210B designate a green light modulating unit, a red light modulating unit and a blue light modulating unit, respectively.

In the light modulating unit 210G, a reference character 400G designates an optical deflector, 5G designates a polarization converting element, 6G designates a liquid shutter element, 7G designates a mirror and 81G designates an optical sensor.

A reference character 15G designates a driving signal of the optical deflector 400G, 16G designates a driving signal of the liquid crystal shutter 6G, and 90G designates an output signal of the optical sensor 81G.

A reference character L10G designates an incident light (green) entering the light modulating unit 210G, L20G designates an emitting light (green) emitted from the light modulating unit 210G.

Similarly, in the light modulating unit 210R, a reference character 400R designates an optical deflector, 5R designates an polarization converting element, 6R designates a liquid crystal shutter element, 7R designates a mirror, and 81R designates an optical sensor.

A reference character 15R designates a driving signal of the optical deflector 400R, 16R designates a driving signal of the liquid crystal shutter 6R, and 90R designates a output signal of the optical sensor 81R.

A reference character L10R designates an incident light (red) entering the light modulating unit 210R, L20R designates an emitting light (red) emitted from the light modulating unit 210R.

Similarly, in the light modulating unit 210B, a reference character 400B designates an optical deflector, 5B designates an polarization converting element, 6B designates a liquid crystal shutter element, 7B designates a mirror, and 81B designates an optical sensor.

A reference character 15B designates a driving signal of the optical deflector 400B, 16B designates a driving signal of the liquid crystal shutter 6B, and 90B designates an output signal of the optical sensor 81B.

A reference character L10B designates an incident light (blue) entering the light modulating unit 210B, L20B designates an emitting light (blue) emitted from the light modulating unit 210B.

A reference character L20C designates a synthetic light of the emitting lights L20G, L20R, and L20B of the light modulating units 210G, 210R, and 210B of the respective colors of green, red, and blue. Here, in FIG. 9, a projection lens and a screen are not shown which are to be arranged at some later points in the direction of propagation of the synthetic light L20C.

A reference character L10C is the emitting light of a beam shaping optical system 11 and an emitting luminous flux (white luminous flux) including the respective colors of green, red, and blue lights.

The emitting luminous flux L10C enters the total reflecting prism 82 and, as shown in FIG. 9, is totally reflected by the reflecting plane 83 and entered into the color separating prism 84.

In the color separating prism 84 are provided the red reflecting plane 85 made of a dielectric film or the like and reflecting red light and the blue reflecting plane 86 made of a dielectric film or the like and reflecting blue light. The emitting luminous flux L10C entering the color separating prism 84 is separated into incident lights L10G, L10R, L10B which enter the respective light modulating units 210G, 210R, and 210B.

The emitting luminous flux L10C emitted from the beam shaping optical system 11 includes so called three primary colors of red (R), green (G), and blue (B). This emitting luminous flux L10C enters the total reflecting prism 82 and is totally reflected and bent downward in the figure by the reflecting plane 83 provided in the total reflecting prism 82.

The bent emitting luminous flux L10C enters the color separating prism 84. In the color separating prism 84 are provided the red reflecting plane 85 for reflecting red light and the blue reflecting plane 86 for reflecting blue light.

Accordingly, the red light included in the emitting luminous flux L10C entering the color separating prism 84 is reflected in the left direction in the figure by the red reflecting plane 85 and is entered into the red light modulating unit 210R (incident light L10R).

Further, similarly, the blue light included in the emitting luminous flux L10C entering the color separating prism 84 is reflected in the right direction in the figure by the blue reflecting plane 86 and is entered into the blue light modulating unit 210B (incident light L10B).

Since the green light included in the emitting luminous flux L10C is not reflected by the red reflecting plane 85 and the blue reflecting plane 86, it propagates downward and enters the green light modulating unit 210G (incident light L10G).

The incident light L10R entering the light modulating unit 210R enters the optical deflector 400R and generates the ON light (corresponding to the emitting light L20R) and the OFF light L30R in the same way as the optical deflector 400 described above.

The emitting light L20R enters the color separating prism 84 as the emitting light of the light modulating unit 210R and is reflected upward in the figure by the red reflecting plane 85 provided in the color separating prism 84 (becomes the red optical component of the synthetic light L20C).

The OFF light L30R returns to the light emitting point of the light source 9 through a path opposite to the path through which the incident light L10R propagates by the same operations of the polarization converting element 5R, the liquid crystal shutter element 6R and the mirror 7R as those of the polarization converting element 5, the liquid crystal shutter element 6 and the mirror 7 which have been described above.

The light returned to the light source 9 is reflected by the reflecting plate 10 and again enters the light modulating unit 210R and thereafter the same operation is repeated.

The incident light L10B entering the light modulating unit 210B enters the optical deflector 400B to generate the ON light (corresponding to the emitting light L20B) and the OFF light L30B by the same operation as the optical deflector 400 described above.

The emitting light L20B enters the color separating prism 84 as the emitting light of the light modulating unit 210B and is reflected upward in the figure by the blue reflecting plane 86 provided in the color separating prism 84 (becomes the blue light component of the synthetic light L20C).

The OFF light L30B returns to the light emitting point of the light source 9 through a path opposite to the path through which the incident light L10B propagates by the same operations of the polarization converting element 5B, the liquid crystal shutter element 6B and the mirror 7B as those of the polarization converting element 5, the liquid crystal shutter element 6 and the mirror 7 which have been described above.

The light returned to the light source 9 is reflected by the reflecting plate 10 and again enters the light modulating unit 210B and thereafter the same operation is repeated.

The light incident light L10G entering the light modulating unit 210G enters the optical deflector 400G to generate the ON light (corresponding to the emitting light L20G) and the OFF light L30G by the same operation as the optical deflector 400 described above.

The emitting light L20G enters the color separating prism 84 as the emitting light of the light modulating unit 210G, but is not reflected by the red reflecting plane 85 and the blue reflecting plane 86 and propagates straight and transmits upward in the figure (becomes the green light component of the synthetic light L20C).

The OFF light L30G returns to the light emitting point of the light source 9 through a path opposite to the path through which the incident light L10G propagates by the same operations of the polarization converting element 5G, the liquid crystal shutter element 6G and the mirror 7G as those of the polarization converting element 5, the liquid crystal shutter element 6 and the mirror 7 which have been described above.

The light returned to the light source 9 is reflected by the reflecting plate 10 and again enters the light modulating unit 210G and thereafter the same operation is repeated.

As described above, the emitting lights L20R, L20B, and L20G enter the total reflecting prism 82. Since these emitting lights L20R, L20B, and L20G do not satisfy the total reflection conditions at the reflecting plane 83, they are not reflected by the reflecting plane 83, but are transmitted therethrough and are emitted from the total reflecting prism 84 as synthetic light L20C.

The emitting synthetic light L20C is projected to a screen through a projection optical system (not shown) provided at the later position.

In this respect, it is also recommended that the light modulating units 210R, 210B, and 210G be provided with optical sensors 81R, 81B, and 81G and receive parts of the OFF lights L30R, L30B, and L30G and monitor the light intensities of the respective OFF lights by the use of the output signals 90R, 90B, and 90G which are outputted by the respective optical sensors.

According to this configuration, it is possible to detect the ratios of the respective colors of the OFF light returning to the vicinity of the light emitting point of the light source 9. That is, since the ratios of the respective colors returning to the vicinity of the light source 9 can be varied by the use of the liquid crystal shutter elements 6R, 6B, and 6G based on the respective output signals 90R, 90B, and 90G, basically, it is possible for white light to return.

Figure 10:
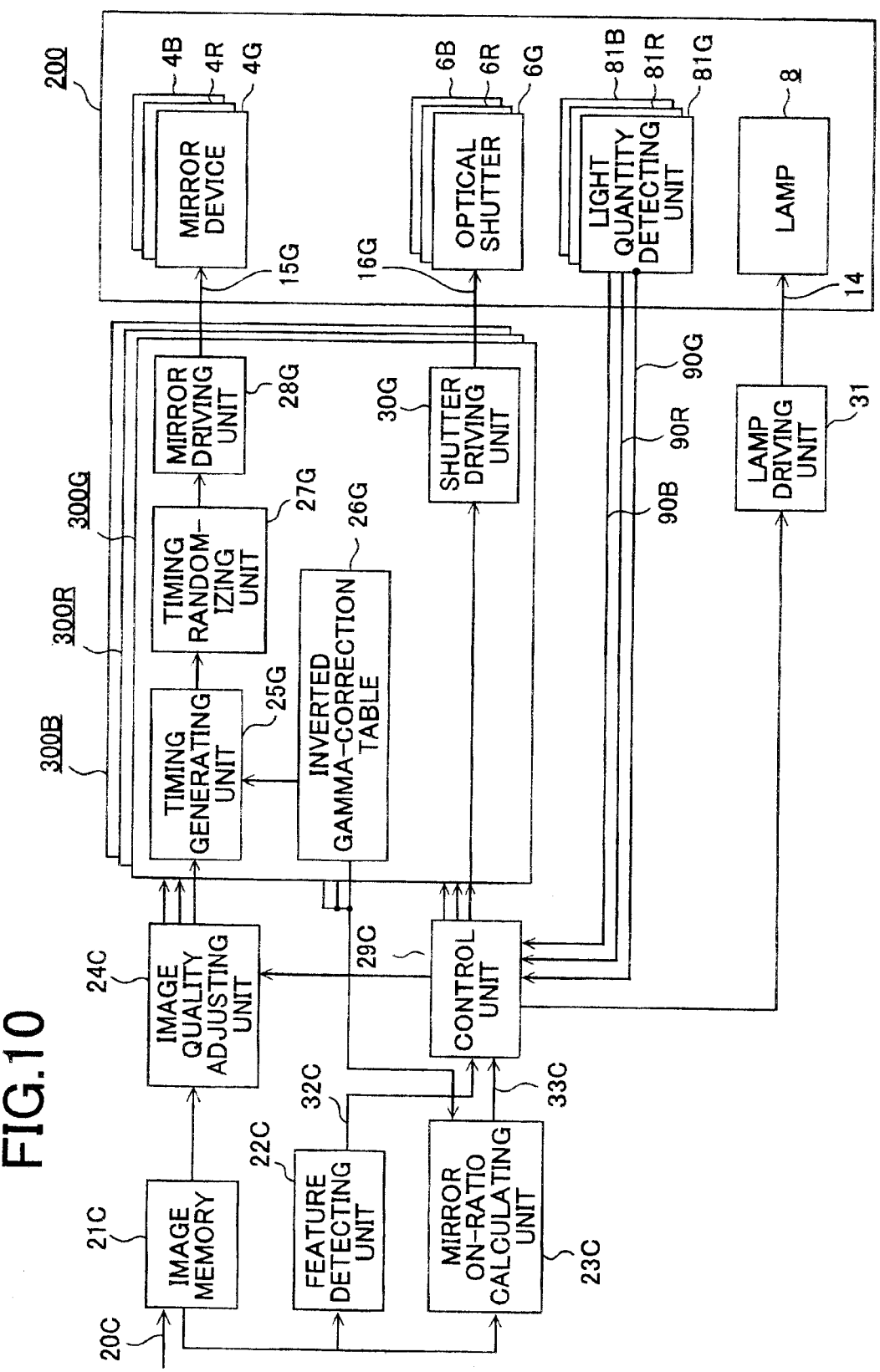
FIG. 10 is a functional block diagram to show the signal processing of a projection television of a preferred embodiment 3 in accordance with the present invention.

FIG. 10 is a functional block diagram to show a signal processing device for processing the signal of the projection television of the preferred embodiment 3 in accordance with the present invention.

In FIG. 10, a reference character 20C designates a color television image signal, 21C designates an image memory, 22C designates a unit for detecting features or qualities of an image, 23C designates a unit for calculating the average ON ratio P of the mirror elements of the respective color lights.

A reference character 24C is an image quality adjusting unit, 29C designates a control unit, and 300G, 300R, and 300B designate signal processing units of green, red, and blue.

In the configuration of the signal processing unit 300G, a reference character 25G designates a timing generating unit for generating ON/OFF timings to be given to the mirror elements of the optical deflector 400G, and 26G designates an inverted gamma-correction table to represent the beam current characteristics of a CRT.

A reference character 27G designates a timing randomizing unit for varying ON/OFF timing for each of the mirror elements, 28G designates a driving unit for outputting a driving signal for driving the mirror elements, 30G designates a driving unit for outputting a driving signal for driving the liquid crystal shutter element 6G.

The operation of the signal processing unit 300G will be described in the following. Here, since the configurations and operations of the signal processing units 300R and 300B are basically the same as those of the signal processing unit 300G, the description thereof will be omitted.

An image memory 21C stores an inputted color television signal 20C as a digital signal (image data) per one frame/field (one screen).

The image data stored in the image memory 21C is outputted to the feature detecting unit 22C and the average ON ratio calculating unit 23C. The feature detecting unit 22C detects the features of the image such as maximum value, the minimum value and average value of the luminance level of the inputted image data.

The average ON ratio detecting unit 23C reads out the coefficient for the inverted gamma-correction corresponding to the luminance level of the respective pixels in the inputted image data from the inverted gamma-correction table 26G and performs the inverted gamma correction. Further, the average ON ratio detecting unit 23C calculates an average ON ratio Pg in the optical deflector 400G based on the corrected image data (in the signal processing unit 300R and 300B, an average ON ratios Pr and Pb are calculated)

The image quality adjusting unit 24C reads out the image data stored in the image memory 21C and adjusts (corrects) the image data so as to make a desired image quality. Thereafter, the image quality adjusting unit 24C outputs the image data after adjustment to the timing generating unit 25G.

The timing generating unit 25G reads out the coefficient for the inverted gamma correction corresponding to the luminance level of the respective pixels of the inputted image data from the inverted gamma-correction table 26G and performs the inverted gamma correction (the signal processing units 300R and 300B read out the coefficients from the inverted gamma-correction tables 26R 26B and perform the inverted gamma correction).

Further, the timing generating unit 25G generates and outputs a timing signal to set the individual mirror elements included in the optical deflector 400G in the "ON" state based on the image data subjected to the inverted gamma correction (in the signal processing units 300R and 300B, timing signals are outputted by the respective timing generating units 25R and 25B).

The timing signal outputted by the timing generating unit 25G is inputted into the timing randomizing unit 27G. The inputted timing signal is subjected to a shift operation on a time axis so that timings vary among the pixels to make a new timing signal and is outputted (in the signal processing units 300R and 300B, the new timing signals are outputted by the timing randomizing units 27R and 27B).

The new timing signal outputted by the timing randomizing unit 27G is inputted into the mirror driving unit 28G. The mirror driving unit 28G outputs a driving signal for driving the mirror elements included in the optical deflector 400G to the optical deflector 400G based on the new timing signal to drive the mirror elements (in the signal processing units 300R and 300B, the new timing signals are inputted into the mirror driving units 28R and 28B to drive the mirror elements of the optical deflectors 400R and 400B).

Into the control unit 29C are inputted a feature signal 32C and an average ON ratio Pg signal 33C. The control unit 29C outputs control signals to the shutter driving units 30G and lamp driving units 31G based on these inputted signals, respectively. Further, the control units 29c outputs an image quality adjusting control signal 34C to the image quality adjusting unit 24C (in the signal control units 300R and 300B, the control unit 29C outputs control signals to the shutter driving units 30R and 30B and lamp driving unit 31R and 31B).

As described above, the optical deflectors 400G, 400R and 400B and liquid crystal shutter elements 6G, 6R and 6B, and the lamp 8 which are included in the optical unit 200 are driven, respectively.

When the respective light modulating units 210G, 210R and 210B are provided with the optical sensors 81G, 81R and 81B, the ratios of light of the respective colors returning to the vicinity of the light source 9 are varied by the liquid crystal shutter elements 6G, 6R and 6B, as described above, based on the output signals 90G, 90R and 90B outputted by these optical sensors 81G, 81R and 81B.

According to this configuration, it is possible to detect the ratios of the respective colors of the OFF light returning to the vicinity of the light emitting point of the light source 9 and to basically make white light return.

It is possible to predict an increase ratio in luminous flux caused by the re-use of the OFF light by applying the equation (3) in the description of the preferred embodiment 1 in accordance with the present invention to the respective colors.

Figure 11:
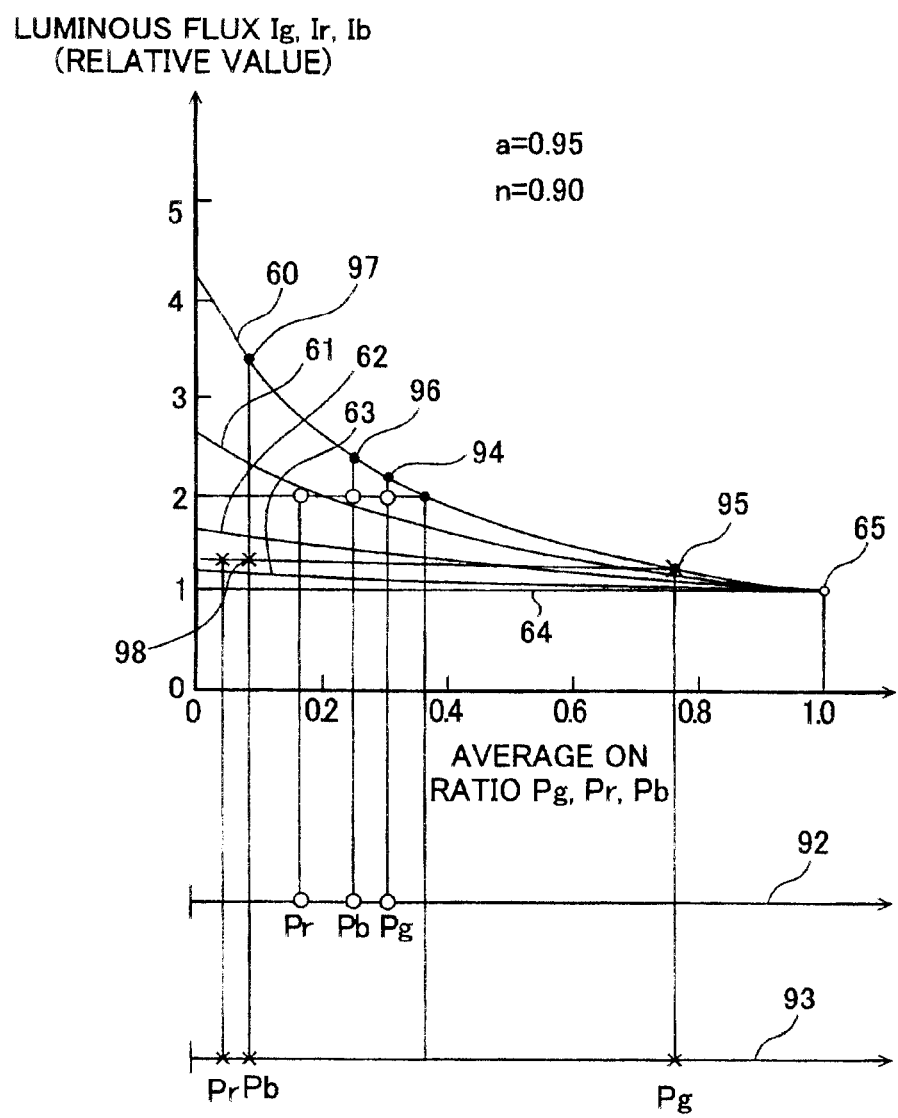
FIG. 11 is an illustration to show an operation in which a control unit of a projection television of a preferred embodiment 3 in accordance with the present invention controls the incident luminous flux I of a projection type light modulating element.

FIG. 11 shows the results of calculation of the luminous fluxes of the respective colors by the equation (3) and the lateral axis designates the average ON ratio Pg, Pr and Pb (Pg is an average ON ratio corresponding to green, Pr is an average ON ratio corresponding to red, and Pb is an average ON ratio corresponding to blue, respectively) and the vertical axis designates the light intensity Ig, Ir, Ib (Ig is a light intensity corresponding to green, Ir is a light intensity corresponding to red, and Ib is a light intensity corresponding to blue).

Curves 60 to 63 show changes in characteristics of the light intensities Ig, Ir and Ib in the case where the ratio K is varied 1.0, 0.8, 0.5 and 0.2, for the sake of simplification, under the conditions that the reflectance factor a of the reflecting plate 10 is 0.95 and the light transfer rate n of the beam shaping optical system 11 is 0.90 for the respective colors. Further, a reference character 64 designates the light intensity in the case where the OFF light is not returned to the light source 9.

A reference character 65 designates the point of the light intensities Ig, Ir and Ib when the average ON ratios Pg, Pr and Pb are 100% (that is, there is no OFF light). Further, axes 92 and 93 designate the results of detection of the average ON ratios of the respective colors for the two different kinds of image signals.

In the example shown by the axis 92, the average ON ratio is small for any color. The average ON ratio Pg for green can be increased to the light intensity level shown by a point 94 in the case where the ratio K is 1.0. Therefore, it is possible to adjust an increase rate of the light intensity to 2 for all colors by controlling the ratio K.

On the other hand, in the example shown by the axis 93, since the average ON ratio Pg of green is large, the light intensity can be increased only to the level shown by a point 95. That is, the average ON ratio Pb of blue, one of the other colors (red, blue), for example, can be increased to a level shown by a point 97 by itself, but it is adjusted to the level shown by a point 98 of the same level as the green. In this way, it is possible to correctly display the hue of a display image.

The control unit 29C in FIG. 10, into which the ON ratio signals 33C of the respective colors outputted by the average ON ratio calculating unit 23C, the maximum value Vmax (maximum value of the luminance of the image), the minimum value Vmin (minimum value of the luminance of the image), and the average value Vave (average value of luminance of the image) of the luminance outputted as the features of the image by the feature detecting unit 22C, and the output signals 90G, 90B and 90R outputted in correspondence with the respective optical sensors 81G, 81B and 81R are inputted, performs the following control according to a combination of these data and a change in time.

That is, the control unit 29C calculates an increase rate of the maximum light intensity Gg, Gr and Gb by the equation (3), based on the average ON ratios Pg, Pr and Pb of the respective inputted colors, the specific values of the reflectance factor a of the reflecting plate 10, the light transfer rate n of the beam shaping optical system 11, the average ON ratio P and the ratio K which are determined by the optical components. Here, the minimum value of the increase rates of Gg, Gr and Gb is made Gmin.

For example, in the case where the initial value Glim (upper limit value) of the increase rate is 2 and the minimum value Gmin of the increase rate of the increase rate is less than the initial value Glim, the control unit 29C controls the ratio K by driving the optical shutter elements 6G, 6B and 6R so that the increase rates of all colors become the minimum value Gmin.

In the case where the minimum value Gmin of the increase rate is larger than the initial value Glim of the increase rate, the control unit 29C controls the ratio K by driving the optical shutter elements 6G, 6B and 6R so that the increase rates of all colors become the initial value Glim.

In this respect, in the case where the minimum value Gmin of the increase rate exceeds the initial value Glim of the increase rate and the difference between the maximum value Vmax of the luminance and the minimum value Vmin of the luminance is large and close to the maximum range of change in the image, the control unit 29C judges that the image has a high contrast and changes the initial value Glim of the increase rate into a value larger than the minimum value Gmin of the increase rate.

The control unit 29C increases the upper limit of the increase rate in this way and controls the image quality adjusting unit 24C to adjust the quality of the image so that the image has a higher contrast.

Further, the control unit 29C keeps the average value Vave of the luminance at least for several fields (or several frames). In the case where the average luminance is small in sequence for plural fields (or plural frames), the control unit 29C judges that a lot of OFF light is generated.

The control unit 29C sets the ratio K of the respective colors at a value close to the maximum value and controls the lamp driving unit 31 to lower the brightness of the lamp 8.

Further, a case where the average value Vave of the luminance is small corresponds to a case where all of the average ON ratios Pg, Pr and Pb are small and nearly close to 0. Therefore, it is possible to increase the increase rate of light by about 4 times by maximizing the ratio K corresponding to the respective colors.

In this respect, in the case of this condition, for example, it is also possible to increase the increase rate of light by 2 times by halving the intensity of light generated by the lamp 8.

In general, a lack in a color balance in a color image display presents a problem that an image to be displayed in white in itself is displayed in color.

By the way, in the control unit 29C of the present preferred embodiment can also independently set the light intensities Ig, Ir and Ib in correspondence with the average ON ratios Pg, Pr and Pb.

Therefore, for example, when a color balance is lost by the variations in the optical characteristics of the optical parts or by the changes in the optical characteristics of the optical parts, the control unit 29C can also adjust the lost color balance to an original color balance.

For example, first, the ratio K (the reflectance factor of the OFF light) corresponding to the respective colors is set at the maximum value during a display of a black screen which is in a mute state at the start of the television. In this state, the output signals 90G, 90R, and 90B from the optical sensors 81G, 81R and 81B are inputted into the control unit 29C.

The control unit 29C judges a color balance based on the output signals 90G, 90R and 90B and adjusts control signals to be given to the liquid crystal shutter elements 6G, 6R and 6B so that the light intensities of the respective colors are adjusted to a predetermined ratio to provide an original color balance. According to this adjustment, it is possible to vary the ratio of the light intensities of the respective colors and to adjust the color balance.

In this respect, the configuration to return the OFF light to the light source 9, which comprises a combination of the polarization converting element, the liquid crystal shutter element and the mirror, may comprise the optical deflector 410 as described in the preferred embodiment 2. This can simplify the configuration of the device.

Further, it is possible to determine the light intensities Ig, Ir and Ib with respect to the average ON ratios Pg, Pr and Pb corresponding to the respective colors by a look-up table or a predetermined function equation. The light intensities Ig, Ir and Ib may be predicted for several fields or several frames.

The invention may be embodied in other specific forms without departing from the spirit or essential parts thereof. The above embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The entire disclosure of the Japanese Application No. 2001-092114 filed on Mar. 28, 2001 including specification, claims, drawings and summary are incorporated herein by reference in its entirety.

What is claimed is:

1. An optical source device comprising:
   a lamp;
   a beam shaping optical system including a light uniforming element for uniforming a light intensity distribution in a plane perpendicular to the direction of propagation of the received emitting light of the lamp:
   an optical deflector having a plurality of adjustable mirror elements for changeably reflecting the received emitting light of the beam shaping optical system in either a first direction or a second direction; and
   an optical reflector for reflecting the deflected light from the optical deflector along an axis of said second direction substantially back towards the optical deflector and substantially towards the lamp,
   wherein axes of the first direction and the second direction are different than an axis of the emitting light emitted from the lamp.

2. An optical source device comprising:
   a lamp;
   a beam shaping optical system including a light uniforming element for uniforming a light intensity distribution in a plane perpendicular to the direction of propagation of the received emitting light of the lamp:
   an optical deflector for changeably reflecting the received emitting light of the beam shaping optical system in either a first direction or a second direction; and
   an optical reflector for reflecting light reflected in said second direction, along an axis of said second direction,
   wherein the optical reflector has a polarization converting element for aligning the polarization direction of the light entering the optical reflector, a liquid shutter element for receiving the transmitted light of the polarization converting element, and a mirror for reflecting the transmitted light of the liquid crystal shutter element.

3. An optical source device comprising:
   a lamp;
   a beam shaping optical system including a light uniforming element for uniforming a light intensity distribution in a plane perpendicular to the direction of propagation of the received emitting light of the lamp:

an optical deflector having a plurality of adjustable mirror elements for changeably reflecting the received emitting light of the beam shaping optical system in either a first direction or a second direction;

an optical reflector for reflecting the deflected light from the optical deflector along an axis of said second direction substantially back towards the optical deflector and substantially towards the lamp;

an average ON ratio calculating unit for calculating an average ratio of an ON state of light projected on a display screen during a predetermined period; and a control unit for controlling respective driving states of the lamp, the optical deflector, and the optical reflector, based on the ratio of the ON state of the light outputted by the average ON ratio calculating unit.

4. The optical source device as claimed in claim 3, further comprising an optical sensor whose output signal is inputted into the control unit.

5. The optical source device as claimed in claim 3, wherein the control unit compares a predetermined value with the calculated average ON ratio and controls the quantity of light reflected by the optical reflector based on the comparison.

6. The optical source device as claimed in claim 5, wherein the predetermined value corresponds with a luminance value of the display screen.

7. A optical source device comprising:

a lamp for emitting white light;

a beam shaping optical system including a light uniforming element for receiving the emitting light of the lamp and uniforming the intensity distribution of the emitting light in a plane perpendicular to the direction of propagation of the emtting light of the lamp;

a color separating element for separating the emitting light of the beam shaping optical system into a plurality of colors;

optical deflectors provided respectively for the plurality of colors to changeably reflect the emitting light of the color separating element in either a first direction or a second direction, each optical deflector having a plurality of adjustable mirror elements; and optical reflectors provided for the respective optical deflectors to reflect the deflected light in said second direction substantially back towards their respective optical deflectors and substantially towards the color separating element.

8. The optical source device as claimed in claim 7, further comprising:

an average ON ratio calculating unit for calculating average ratios of ON states of the light of a display screen during a predetermined period for each of the plurality of colors; and a control unit for controlling respective driving states of the lamp, the optical deflectors and the optical reflectors based on the ratios of the ON state of light of the plurality of colors outputted by the average ON ratio calculating unit.

9. The optical source device as claimed in claim 8, further comprising optical sensors for the plurality of colors whose respective output signals are inputted into the control unit.

10. An optical source device comprising:

a lamp for emitting white light;

a beam shaping optical system including a light uniforming element for receiving the emitting light of the lamp and uniforming the intensity distribution of the emitting light in a plane perpendicular to the direction of propagation of the emitting light of the lamp;

a color separating element for separating the emitting light of the beam shaping optical system into a plurality of colors;

optical deflectors provided for a plurality of colors to changeabay reflect the emitting light of the color separating element in either a first direction or a second direction;

optical reflectors provided for the respective optical deflectors to reflect the light reflected in said second direction, along an axis of said second direction; and optical sensors for the plurality of colors whose respective output signals are inputted into a control unit, wherein the control unit calculates increase rates of the plurality of colors, and compares the calculated increase rates of the plurality of colors with a previously set value, and in the case where the increase rates of the respective colors are less than the previously set value, it controls the amount of reflecting light of each optical reflector so that the increase rate of each optical reflector is the minimum value of the increase rates of the respective colors and, in the case where the increase rates of the respective colors are equal to or more than the previously set value, it controls the amount of reflecting light of each optical reflector so that the increase rate of each optical reflector is the previously set value.

11. The optical source device as claimed in claim 10, wherein the previously set value is changed based on a luminance value of the display screen.

12. The optical source device as claimed in claim 10, wherein the amount of reflecting light of each of the optical reflectors is controlled for each of the plurality of colors.

13. A projection television comprising the optical source device in any one of the claims 1 to 12.

14. An optical source comprising:

a lamp;

a beam shaping optical system including a light uniforming element for uniforming a light intensity distribution in a plane perpendicular to the direction of propagation of the received emitting light of the lamp;

an optical deflector for changeably reflecting the received emitting light of the beam shaping optical system in either a first direction or a second direction; and an optical reflector for reflecting the deflected light from the optical deflector along an axis of said second direction substantially back towards the optical deflector and substantially towards the lamp, wherein axes of the first direction and the second direction are different than an axis of the emitting light emitted from the lamp.

15. The optical source device according to claim 14, wherein the optical reflector reflects the deflected light in order to be utilized as an incident light again.

16. The optical source device according to claim 14, wherein the optical deflector reflects the received emitting light in a first direction when the optical reflector is in a first position and wherein the optical deflector reflects the received emitting light in a second direction when the optical deflector is in a second position.

17. A method for projecting light onto a projection screen, the method comprising:

receiving a light beam;

shaping a diameter of the light beam by a beam shaper;

directing the shaped light beam to a projection screen and a reflector assembly by an optical deflector having a plurality of independently adjustable mirror elements, the light beam being directed to the projection screen during a first position of the mirror elements and the light beam being directed to the reflector assembly during a second position of the mirror elements;

selectively controlling an amount of light being directed towards a mirror that is provided in the reflector assembly by a shutter element; and reflecting the controlled amount of light from the mirror substantially back towards the optical deflector.

18. An optical source comprising:

a lamp;

a beam shaping optical system including a light uniforming element for uniforming a light intensity distribution in a plane perpendicular to the direction of propagation of the received emitting light of the lamp;

an optical deflector for changeably reflecting the received emitting light of the beam shaping optical system in either a first direction or a second direction; and an optical reflector for reflecting the deflected light from the optical deflector along an axis of said second direction substantially back towards the optical deflector and substantially towards the lamp, wherein the optical reflector includes a converter for converting a light intensity of the deflected light before reflecting the deflected light.

19. The optical source device according to claim 18, wherein the optical reflector comprises a deflector for changeably reflecting the incident light in two directions, the light reflected in one direction of the two directions being reflected in the direction of the incident light.

20. The optical source device according to claim 18, wherein the converter comprises a polarization converting element for aligning the polarization direction of the light entering the optical reflector and a liquid shutter element for receiving the transmitted light of the polarization converting element.

* * * * *